UNITED STATES PATENT OFFICE.

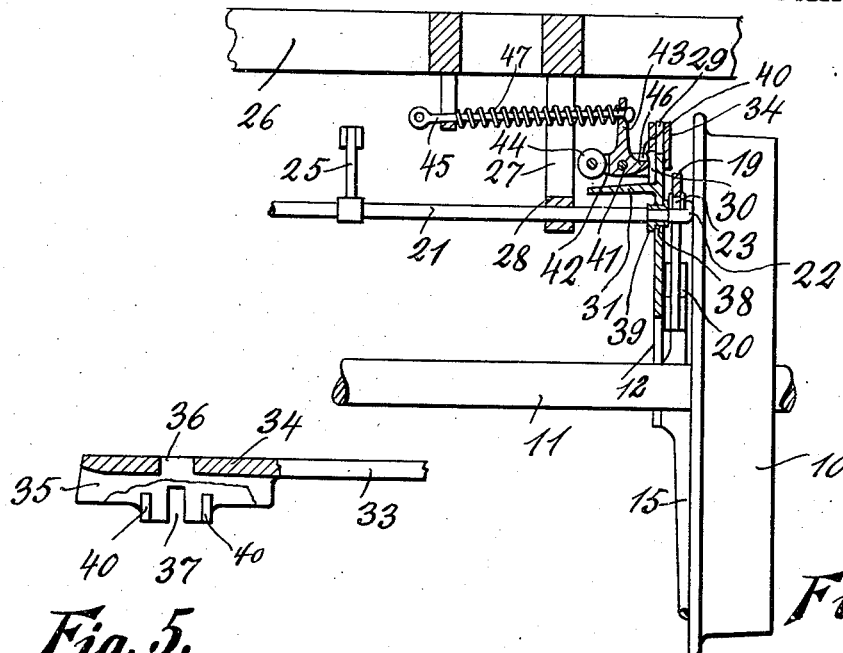
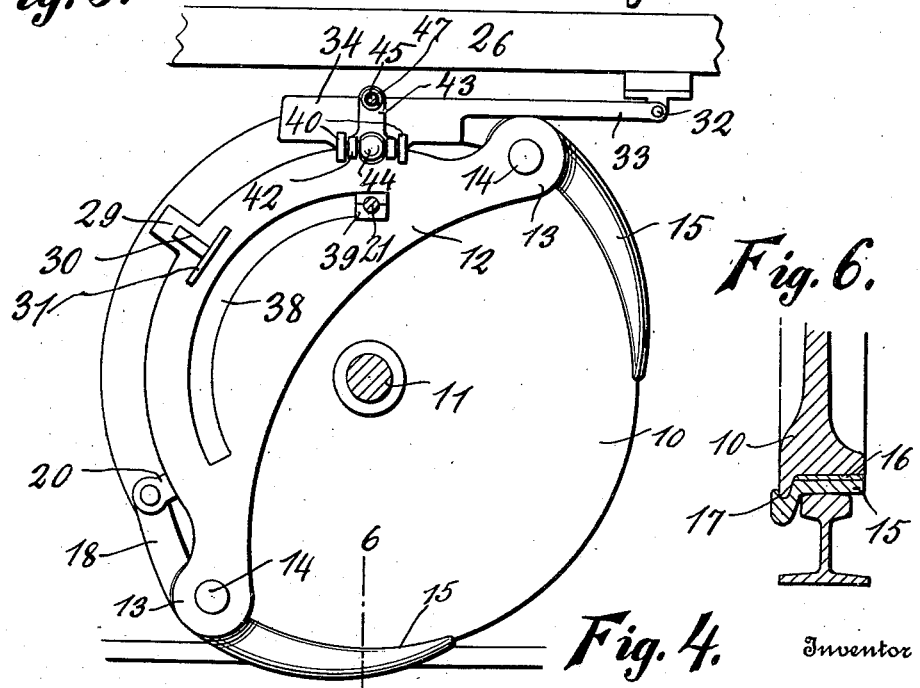

CHARLES W. DRAKE, OF WELLINGTON, TEXAS.

RAILWAY-BRAKE.

1,074,700.  Specification of Letters Patent.  Patented Oct. 7, 1913.

Application filed June 26, 1913. Serial No. 775,928.

*To all whom it may concern:*

Be it known that I, CHARLES W. DRAKE, a citizen of the United States, residing at Wellington, in the county of Collingsworth and State of Texas, have invented certain new and useful Improvements in Railway-Brakes, of which the following is a specification.

This invention relates to railway brakes, which are constructed to grip the wheels, and which, in the event of an emergency, may be set to lift the wheels off the track in order to obtain a quick stoppage of the train.

It is the object of the invention to provide a brake of the kind stated which is simple in construction and reliable in operation, and to this end it consists in a novel combination and arrangement of parts to be hereinafter described and claimed.

In order that the invention may be better understood, reference is had to the accompanying drawings, in which—

Figure 1:
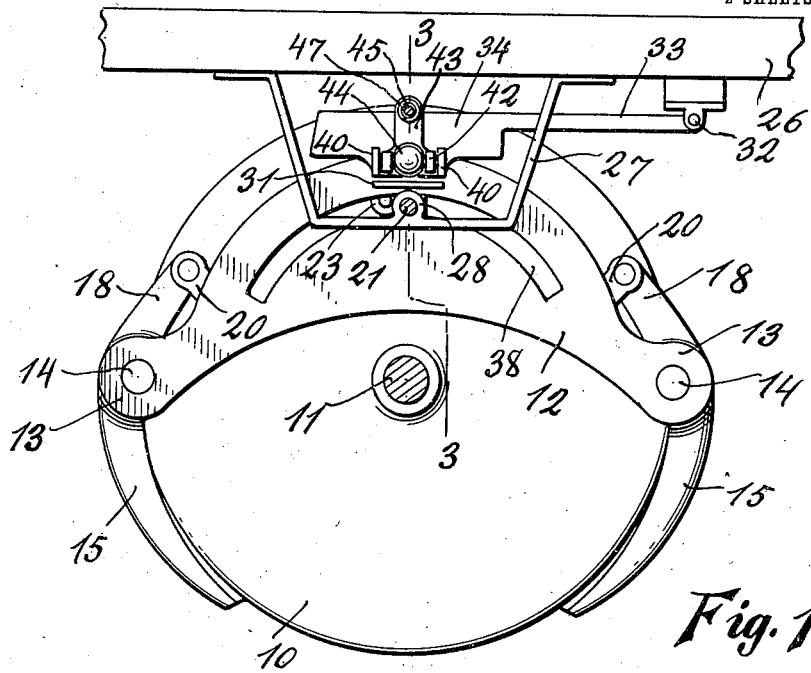
Figure 2:
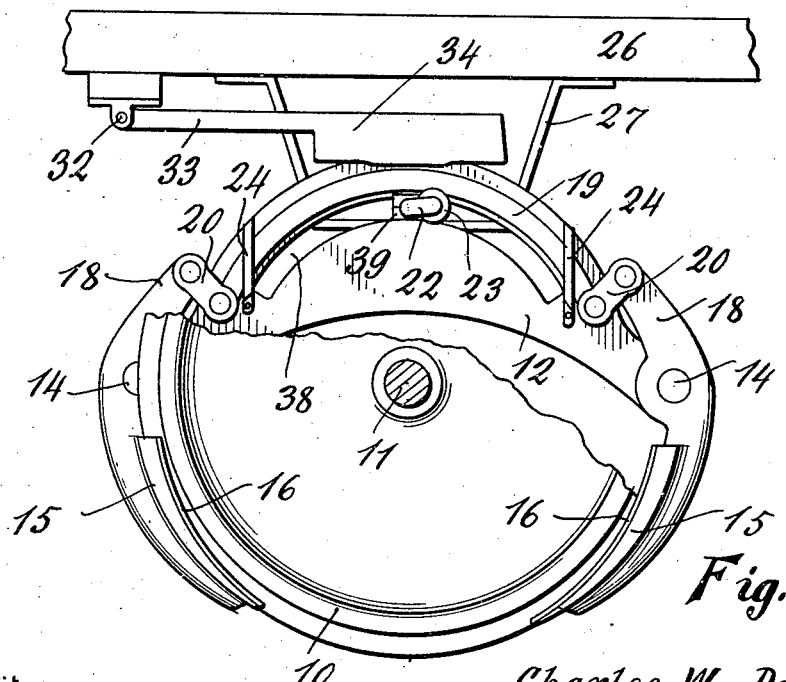

Figure 1 is a side elevation of the brake mechanism. Fig. 2 is a similar view showing the opposite side of the mechanism. Fig. 3 is a vertical section on the line 3—3 of Fig. 1. Fig. 4 is an elevation showing the emergency application of the brake. Fig. 5 is an elevation, partly broken away, of a part of the mechanism. Fig. 6 is a cross section on the line 6—6 of Fig. 4.

In the drawings 10 denotes one of the wheels of a railway car, and 11 is the axle thereof. Opposite the inner face of the wheel, above the axle, is located a plate 12 having reduced ends 13 located on opposite sides of the axle. To each of these ends of the plate is pivoted, by any suitable means 14, a brake shoe 15 having a curved face to conform to the tread of the wheel. The shoe is faced with a removable strip 16 of steel, and has a groove 17 to accommodate the tread flange of the wheel, as clearly shown in Fig. 6.

Two brake shoes are provided, the same being located respectively on opposite sides of the wheel. The upper ends of the brake shoes have extensions 18 between which is located a curved bar 19 connected at its ends by links 20 to the extensions of the respective brake shoes. Above the axle, parallel thereto, is located a rock shaft 21 having at its end a crank bend 22 which carries a grooved roller 23, engaging the bottom edge of the bar 19. When the shaft is rocked in a direction to swing the roller upward, the bar 19 is carried in the same direction, and by reason of its connection with the brake shoes, the latter are swung on their pivots to grip the wheel. This is for a service application of the brakes. The emergency application will be presently described.

The bar 19 is located between the wheel 10 and the plate 12, and on the latter are guides 24 under which the bar works. The shaft 21 is provided with a rocker arm 25, which is connected to a brake cylinder. The truck frame 26 carries hangers 27 which support bearings 28 in which the shaft is journaled.

Midway between the ends of the plate 12, the latter has at the top an upward projecting lug 29 on the face of which is an outstanding longitudinal rib 30, and below the rib, the plate has an outstanding flange or shelf 31. To the truck frame 26 is pivoted at one end, as indicated at 32, an arm 33 having at its free end an enlargement 34 provided with a bottom groove 35 to receive the lug 29. The part 34 has a top recess 36 opening into the groove, into which recess the upper extremity of the lug extends. The face of the part 34 has a recess 37 to receive the rib 30.

The plate 12 is normally positioned so that the lug 29 seats in the groove 35 as described. With the parts in this position, the plate is locked and prevented from tilting. This is the position of the plate when the brakes are off, and when a service application is made. For an emergency application, the plate will be released so that it may tilt as shown in Fig. 4, and allow one of the brake shoes to come between the rail and the wheel as will be more fully described hereinafter. The plate 12 has an arcuate slot 38 in which is loosely mounted a boxing 39 through which the shaft 21 passes. Thus, the shaft does not interfere with the tilting movement of the plate.

The following means are provided for swinging the arm 33 to release the plate 12: On the part 34, on opposite sides of the recess 37, are outstanding ears 40, between which latter is pivoted, at its angle, as indicated at 41, a bell-crank lever having one of its branches 42 horizontal and its other branch 43 vertical. The branch 42 is located above the shelf 31 and carries a roller 44 which normally occupies a position a short distance above the shelf. To the branch 43 is connected a rod 45 for swinging the bell-crank lever, said rod being connected to an auxiliary brake cylinder. The bell-crank lever also has a branch 46 extending rearward in the opposite direction from the branch 42 and engaging the rib 30. A spring 47 holds the bell-crank lever normally in such a position that the part 46 engages the rib 30, whereby the plate 12 is firmly locked. The release of the plate is effected by swinging the bell-crank lever in a direction to withdraw the part 46 from the rib 30 and to engage the roller 44 with the shelf 31. The part 46 is first disengaged, and a further swing of the bell-crank lever presses the roller down on the shelf, whereby the arm 33 is lifted, and the lug 29 slips out of the groove 35. The plate 12 is now free and may tilt or swing in the direction the wheel 10 is turning, until the boxing 39 reaches the end of the slot 38, which carries the brake shoe which is in front of the wheel down to the rail and it becomes wedged between the tread thereof and the tread of the wheel, as shown in Fig. 4. The wheel is therefore raised off the rail, the brake shoe sliding on the latter and effecting a quick stoppage of the car, without having damaged the face of the wheel. It is of course to be understood, that a service application is first made, so that the brake shoe, as it hugs the wheel, will be carried down by the latter to the rail. The brake is released from the emergency position by moving the car rearward a slight distance, which carries the parts back to their normal position, the plate 12 swinging back and the lug 29 again entering the groove 35. The rod 45 is loose, so that the arm 33 drops down by gravity when the lug 29 comes opposite the recess 36, and the lug then enters the said recess. The rod 45 having, in the meantime, been released, the plate 12 is again locked, and after the brake shoes are released from the wheel by operating the shaft 21, the parts are back to their normal position, ready for the next application. The ends of the groove 35 are flared to guide the lug 29 therebetween.

The mechanism herein described is simple in construction and highly efficient in operation.

The parts are so arranged that they adjust themselves to wear for a long time, and when necessary, they can be readily removed and replaced. The actuating devices are all located above the axle, and all dragging brake bars, rods, beams, etc., are dispensed with. As there is a brake shoe on each side of the wheel, an emergency application can be made with the wheel turning in either direction.

I claim:

1. A brake comprising opposite brake shoes, a tiltable plate to which the brake shoes are pivoted, a brake setting bar, connections between said bar and the brake shoes, a rock shaft having means to engage the bar for actuating the same, means for locking the plate, and means for releasing the plate to permit the same to tilt to carry one of the brake shoes between the wheel and the part on which the wheel runs.

2. A brake comprising opposite brake shoes, a tiltable plate to which the brake shoes are pivoted, a brake setting bar, connections between said bar and the brake shoes, a rock shaft having means to engage the bar for actuating the same, a lug extending from the plate, a pivoted arm having a recess to receive the lug, and means for swinging the arm to release the lug to permit the plate to tilt and carry one of the brake shoes between the wheel and the part on which the wheel runs.

3. A brake comprising a tiltable plate, brake shoes carried by said plate, means for applying the brake shoes, means for locking the plate, and means for releasing the plate to permit the same to tilt to carry one of the brake shoes between the wheel and the part on which the wheel runs.

4. A brake comprising a tiltable plate, brake shoes carried by said plate, means for applying the brake shoes, a lug extending from the plate, a pivoted arm having a recess to receive the lug, and means for swinging the arm to release the lug to permit the plate to tilt and carry one of the brake shoes between the wheel and the part on which the wheel runs.

5. A brake comprising a tiltable plate, brake shoes carried by said plate, means for applying the brake shoes, a lug and a shelf extending from the plate, a pivoted arm having a recess to receive the lug, and a lever carried by the arm and having means engageable with the shelf to lift the arm to release the lug to permit the plate to tilt and carry one of the brake shoes between the wheel and the part on which it runs.

6. A brake comprising a tiltable plate, brake shoes carried by said plate, means for applying the brake shoes, a lug and a shelf extending from the plate, said lug having a rib, a pivoted arm having a recess to receive the lug and its rib, a lever carried by the arm and having a branch engageable with the aforesaid rib, and means carried by the lever to lift the arm to release the lug to permit the plate to tilt and carry one of the braket shoes between the wheel and the part on which it runs.

7. A brake comprising opposite brake shoes, a tiltable plate to which the brake shoes are pivoted, said plate having an arcuate slot, a brake setting bar, connections between said bar and the brake shoes, a rock shaft passing through the aforesaid slot and having means to engage the bar for actuating the same, means for locking the plate, and means for releasing the plate to permit the same to tilt to carry one of the brake shoes between the wheel and the part on which the wheel runs.

8. A brake comprising opposite brake shoes, a tiltable plate to which the brake shoes are pivoted, a brake setting bar, connections between said bar and the brake shoes, a rock shaft having a crank, a roller carried by the crank and engageable with the bar for actuating the same, means for locking the plate, and means for releasing the plate to permit the same to tilt to carry one of the brake shoes between the wheel and the part on which the wheel runs.

9. A brake comprising a tiltable plate, brake shoes carried by said plate, means for applying the brake shoes, a lug extending from the plate, a pivoted arm having a recess to receive the lug and a groove leading to said recess, and means for swinging the arm to release the lug to permit the plate to tilt and carry one of the brake shoes between the wheel and the part on which the wheel runs.

10. A brake comprising a tiltable plate, pivoted brake shoes carried by said plate, a brake setting bar, links connecting the bar to the brake shoes, means to engage the bar to actuate the same, means for locking the plate, and means for releasing the plate to permit the same to tilt to carry one of the brake shoes between the wheel and the part on which the wheel runs.

In testimony whereof I affix my signature in presence of two witnesses.

CHARLES W. DRAKE.

Witnesses:
W. W. CREATH,
E. E. McCOLLISTER.